United States Patent [19]

Tsujihara et al.

[11] Patent Number: 5,398,083
[45] Date of Patent: Mar. 14, 1995

[54] CONVERGENCE CORRECTION APPARATUS FOR USE IN A COLOR DISPLAY

[75] Inventors: Susumu Tsujihara, Neyagawa; Ikunori Inoue; Yasuaki Sakanishi, both of Takatsuki, all of Japan

[73] Assignee: Matsushita Electric Industrial Co. Ltd., Osaka, Japan

[21] Appl. No.: 142,684

[22] Filed: Oct. 26, 1993

[30] Foreign Application Priority Data

Oct. 26, 1992 [JP] Japan .................. 4-287333

[51] Int. Cl.⁶ .......................................... H04N 9/28
[52] U.S. Cl. ........................ 348/807; 348/558; 315/368.13
[58] Field of Search ............... 348/466, 558, 615, 807, 348/806; 315/368.12, 368.13, 365, 367; H04N 3/26, 9/28, 3/23

[56] References Cited

U.S. PATENT DOCUMENTS

| | | | |
|---|---|---|---|
| 4,239,142 | 12/1980 | Schonmeier et al. | 226/194 |
| 4,672,275 | 6/1987 | Ando | 315/368 |
| 4,673,847 | 6/1987 | Louie et al. | 315/368.13 |
| 4,999,703 | 3/1991 | Henderson | 358/60 |
| 5,111,284 | 5/1992 | Tsujihara et al. | 358/60 |
| 5,216,497 | 6/1993 | Tsujihara et al. | 315/368.13 |

FOREIGN PATENT DOCUMENTS

| | | | |
|---|---|---|---|
| 55-61552 | 5/1980 | Japan | B65H 23/02 |
| 55-163981 | 12/1980 | Japan | H04N 9/28 |
| 56-169984 | 12/1981 | Japan | H04N 9/28 |
| 60-130288 | 7/1985 | Japan | H04N 9/28 |
| 2-202784 | 8/1990 | Japan | H04N 5/278 |
| 3178290 | 8/1991 | Japan | H04N 9/28 |
| 3179893 | 8/1991 | Japan | H04N 9/28 |
| 5176335 | 7/1993 | Japan | H04N 9/28 |

*Primary Examiner*—James J. Groody
*Assistant Examiner*—Jeffrey S. Murrell
*Attorney, Agent, or Firm*—Ratner & Prestia

[57] ABSTRACT

A signal generating apparatus comprises: a scanning-line number detector (2) for detecting the number of scanning lines with receipt of a sync signal; a convergence memory (3) for storing convergence correction data; an on-screen display memory (5) for storing on-screen display data; an interpolator (4) for performing vertical interpolation of output data derived from the memories (3, 5) according to the detection signal derived from the scanning-line number detector (2); and a frame memory (6) for successively reading data elements corresponding to the individual scanning lines interpolated by the interpolator (4). The apparatus detects the number of scanning lines and generates a correction signal and a character signal through vertical processing of convergence correction data and on-screen character data.

3 Claims, 15 Drawing Sheets

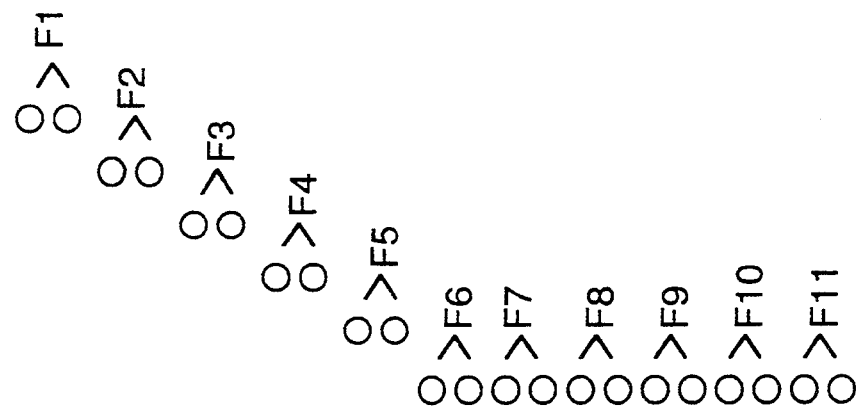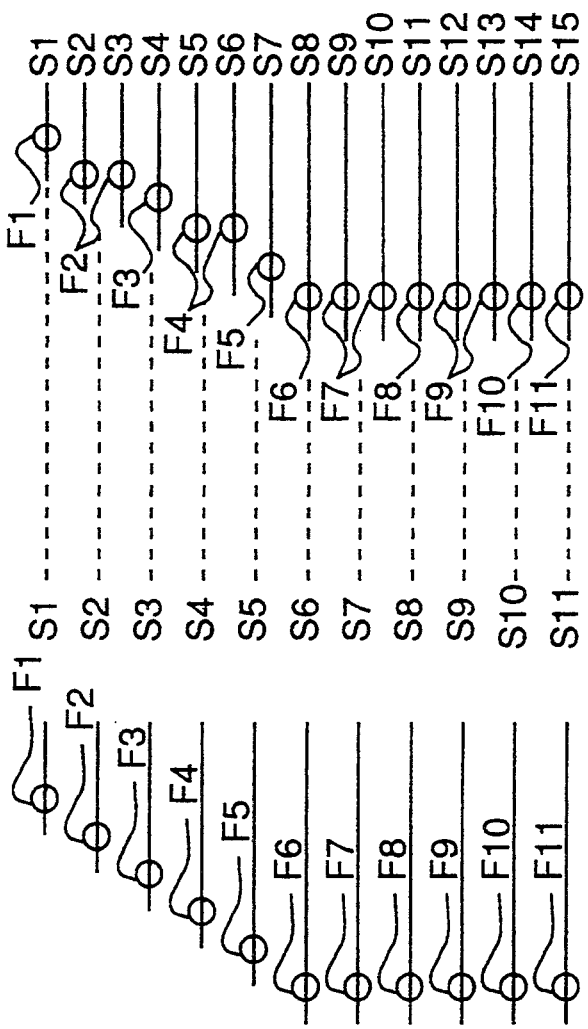

ONE HORIZONTAL SCANNING PERIOD

ONE VERTICAL SCANNING PERIOD

Fig.12(b)
Fig.12(c)
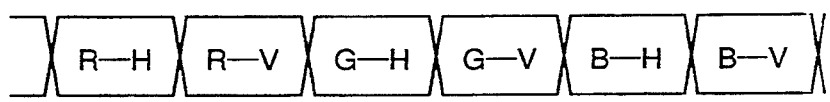
Fig.12(d)
Fig.12(e)
Fig.12(f)
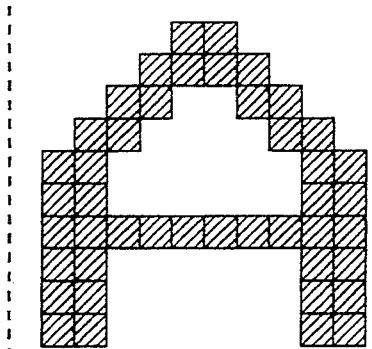

● ADJUSTMENT POINT

CONVERGENCE CORRECTION APPARATUS FOR USE IN A COLOR DISPLAY

BACKGROUND OF THE INVENTION

1. Field of the Invention

The present invention relates to a signal generating apparatus for generating various types of signals in a color television receiver, and more particularly to a signal generating apparatus for generating a convergence correction signal and an on-screen display (referred to as, "OSD" hereinafter) character signal simultaneously.

2. Description of the Prior Art

Generally in a video projector, three projection cathode-ray tubes are used for applying light beams of three primary colors of red (R), green (G) and blue (B) for expanding and projecting a video image picture onto a screen, where the incident projection angles (referred to as, "convergence angle" hereinafter) of the light beams from the projection cathode-ray tubes with respect to the screen are different from each other, resulting in that color deviation, focusing deviation, deflection distortion, and luminance change may occur in the picture displayed on the screen. Various corrections to such deviations have been implemented by a system in which analog-like correction waveforms are created in synchronization with horizontal and vertical scanning periods and the amplitude (size) and shape of the analog-like correction waveforms are varied to be adjusted for the corrections. However, the conventional system as mentioned above has been accompanied by a problem in correction accuracy.

Under such circumstances, there have been disclosed some digital convergence apparatuses in the U.S. Pat. Nos. 5,111,284 and 4,672,275 and in the Japanese Patent Unexamined Laid-Open 8114/1984, teaching a method of convergence correction with high accuracy. Besides, disclosed is a digital convergence apparatus in the U.S. Pat. 4,999,703 and the Japanese Patent Publication 38797/1991, teaching a method in which the correction is performed automatically. Further, disclosed is a digital convergence apparatus in the Japanese Patent Publication 5314/1992 capable of treating various scanning frequencies. Moreover, a multi-scan character display system is suggested in the Japanese Patent Unexamined Laid-Open 202784/1990 teaching a method of treating various scanning frequencies.

The signal Generating apparatus in the above-mentioned conventional video projector is described below with reference to FIG. 14.

Referring to FIG. 14, reference numeral 80 denotes a projection cathode-ray tube; 86 a screen; 87 a projection lens; 90 a convergence yoke; and 91 a deflection yoke. A video signal derived through an input terminal 60 is amplified to a necessary amplitude by a video circuit 81 to drive the projection cathode-ray tube 80. The video circuit 81, which performs the same operation as in the conventional receiver during a normal display mode, projects a crosshatch signal of a digital convergence circuit 82 as shown in the display screen in FIG. 15 during convergence adjustment. In this digital convergence correction, correction data of adjustment points displayed on the screen are stored and interpolation of the correction data among the adjustment points is performed to create a correction waveform. Accordingly, correction can be effected for each adjustment point independently, so that the correction can be implemented with high accuracy.

An OSD (on-screen display) character generator 88 generates OSD characters to be displayed on the display screen in accordance with a sync signal derived through an input terminal 70. An OSD character signal derived from the OSD character generator 88 is fed to the video circuit 81, where the video signal derived through the input terminal 60 is added to the character signal, so that characters are displayed on the display screen. A deflection circuit 83 and the deflection yoke 91 perform the scanning operation of electron beams in the projection cathode-ray tube 80 in synchronization with the sync signal derived through the input terminal 70. Although the projection cathode-ray tube 80 is shown only one in number in FIG. 14, three projection cathode-ray tubes for primary three colors of red (R), green (G), and blue (B) are normally used.

An adjustment pattern detector 85, which is made up of such as a camera for performing photodetection, detects a crosshatch pattern projected on the screen 86 and feeds a detection signal to the adjustment-point detector 84. The adjustment-point detector 84 detects convergence deviation of each adjustment point according to the detection signal fed from the adjustment pattern detector 85 and changes the amount of correction of the digital convergence circuit 82 according to the detected convergence deviation, thus automatically accomplishing convergence adjustment.

As described above, by detecting the convergence deviation of the display on the screen with a photodetector such as a camera and using the resulting detection signal to control correction data, there can be realized an automatically adjustable signal generating apparatus for generating a convergence correction signal and an OSD character signal simultaneously with high accuracy.

However, the signal generation apparatus of the above-described conventional arrangement has been accompanied by problems such that the convergence correction signal could not be generated at arbitrary scanning frequencies, and that the size of OSD characters is varied in accordance with the number of scanning lines. Moreover, in order to treat signal sources having different numbers of input scanning lines, there would arise the need of separately effecting interpolation of correction data among adjustment points and interpolation of character signals in the vertical direction, with the result of quite a large scale of circuitry.

The present invention has been developed with a view of solving the foregoing problems.

SUMMARY OF THE INVENTION

Accordingly, an essential objective of the present invention is to provide a signal generating apparatus which is capable of automatically following signal sources having different scanning frequencies and generating high-accuracy convergence correction signals and character signals by sharing a vertical interpolation processing section in common to generate a convergence signal and a character signal according to the number of the scanning lines.

In order to achieve the aforementioned objective, the present invention provides a signal generating apparatus which comprises: first storage means for storing convergence correction data corresponding to a plurality of adjustment points on a screen; second storage means for storing OSD character data; detection means for detecting the number of scanning lines in accordance with an input sync signal; interpolation means for vertically interpolating data derived from the first and second storage means according to the resulting detection signal; means for continuously reading data derived from the interpolation means; digital-to-analog conversion means for converting the read correction data into an analog signal; and parallel-to-serial conversion means for converting the read character data into a serial signal, wherein correction data and character data are vertically interpolated according to the detection signal of the number of the scanning lines to create a correction signal and a character signal, thus making it possible to automatically follow signal sources small in circuit scale and different in scanning frequency for signal generation and also to realize high-accuracy interpolation.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 9(a), 9(b) and 9(c) are schematic views for explaining the n-fold reading and decimating treatment in the embodiment;

DETAILED DESCRIPTION OF THE PREFERRED EMBODIMENTS

Figure 1:
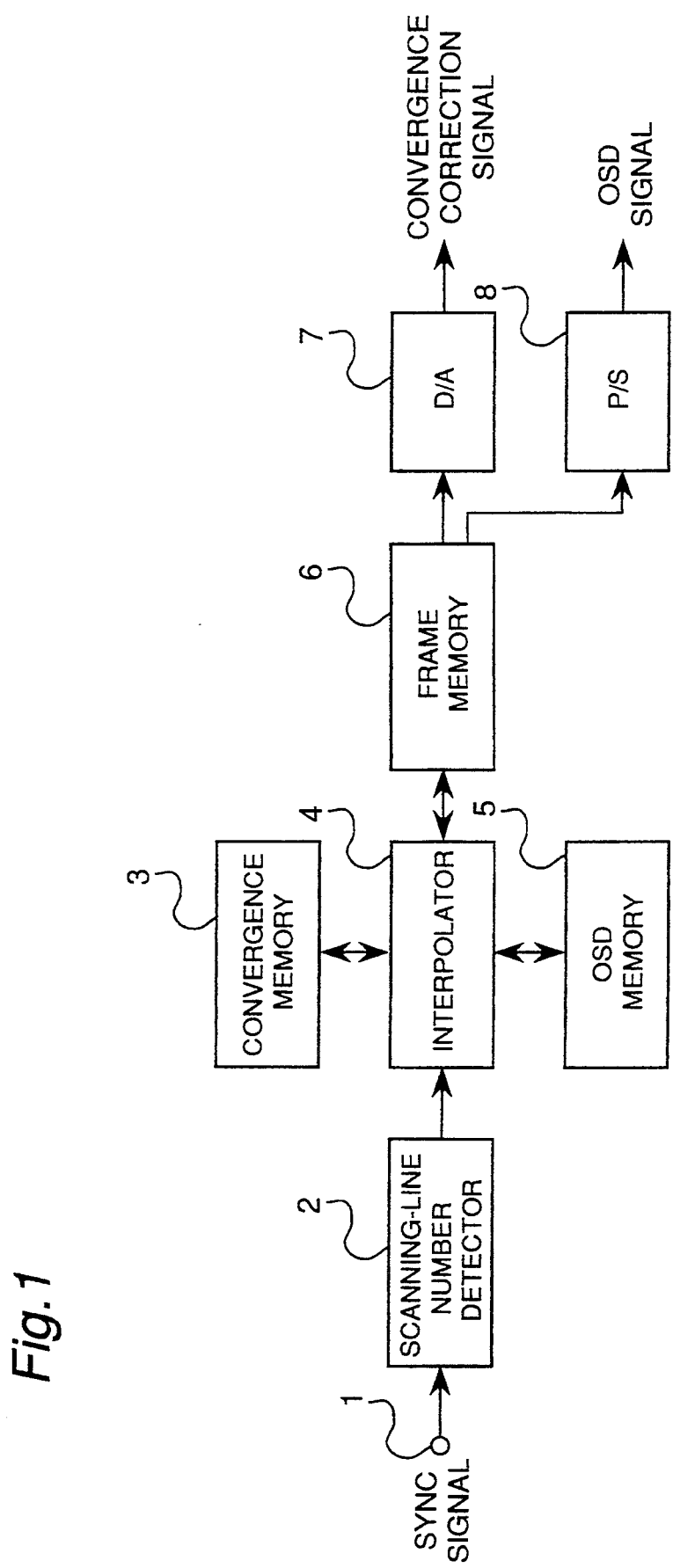
FIG. 1 is a block diagram of a signal generating apparatus according to an embodiment of the present invention.

Before the description proceeds, it is to be noted that like parts are designated by the same reference numerals throughout the drawings.

A preferred embodiment of the present invention is now described below with reference to the accompanying drawings.

FIG. 1 shows a signal generating apparatus according to an embodiment of the invention.

Referring to FIG. 1, reference numeral 1 denotes an input terminal to which a video signal containing a sync signal is fed. The input signal entered through the input terminal 1 is fed to a scanning-line number detector 2 for detecting the number of scanning lines from the sync signal. Reference numeral 3 denotes a convergence memory serving as a first storage means for storing convergence correction data, and reference numeral 5 denotes an OSD (on-screen display) memory serving as a second storage means for storing OSD data. The detection signal derived from the scanning-line number detector 2 is supplied to an interpolator 4 which is interconnected with both the convergence memory 3 and the OSD memory 5. Reference numeral 6 denotes a frame memory which is interconnected with the interpolator 4 for successively reading the data corresponding to individual scanning lines interpolated by the interpolator 4. The correction data signal of digital form derived from the frame memory 6 is converted into an analog signal form by means of a digital-to-analog converter (hereinafter, abbreviated as, "D/A converter") 7 to generate a convergence correction signal, while the parallel character signal derived from the frame memory 6 is converted into a serial signal form by means of a parallel-to-serial converter (hereinafter, abbreviated as, "P/S converter") 8 to generate an OSD signal.

The following describes the operation of the signal generating apparatus of the present embodiment with reference to FIGS. 2, 3(a), 3(b) and 4(a), 4(b).

First, two types of sync signals differing in number of scanning lines from each other are entered through the input terminal 1 and fed to the scanning-line number detector 2. The scanning-line number detector 2 detects the number of scanning lines from each of the sync signals. The number of scanning lines detected by the scanning-line number detector 2 is fed to the interpolator 4, which vertically interpolates both the convergence correction data derived from the convergence memory 3 and the OSD data derived from the OSD memory 5 according to the scanning-line number detection signal.

Figure 2:
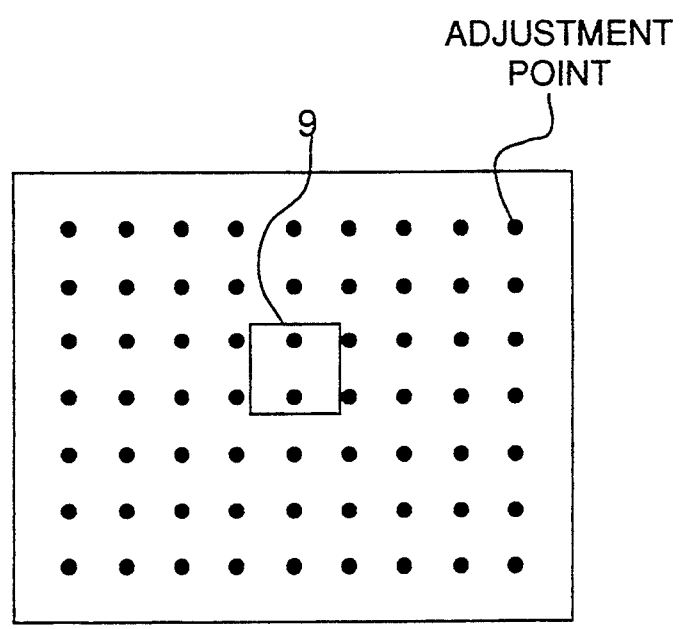
FIG. 2 is a view of a display screen for explaining the operation of the embodiment.

In the convergence memory 3, as shown in the screen view of FIG. 2, a plurality of adjustment points are arranged and correction data for the individual adjustment points are stored. In the OSD memory 5, character font data such as numerals and alphabetical characters necessary for OSD are stored.

FIGS. 3(a), 3(b) and 4(a), 4(b) show the performance of interpolation when a rectangular region 9 in the display screen shown in FIG. 2 is expanded.

Figure 3A:
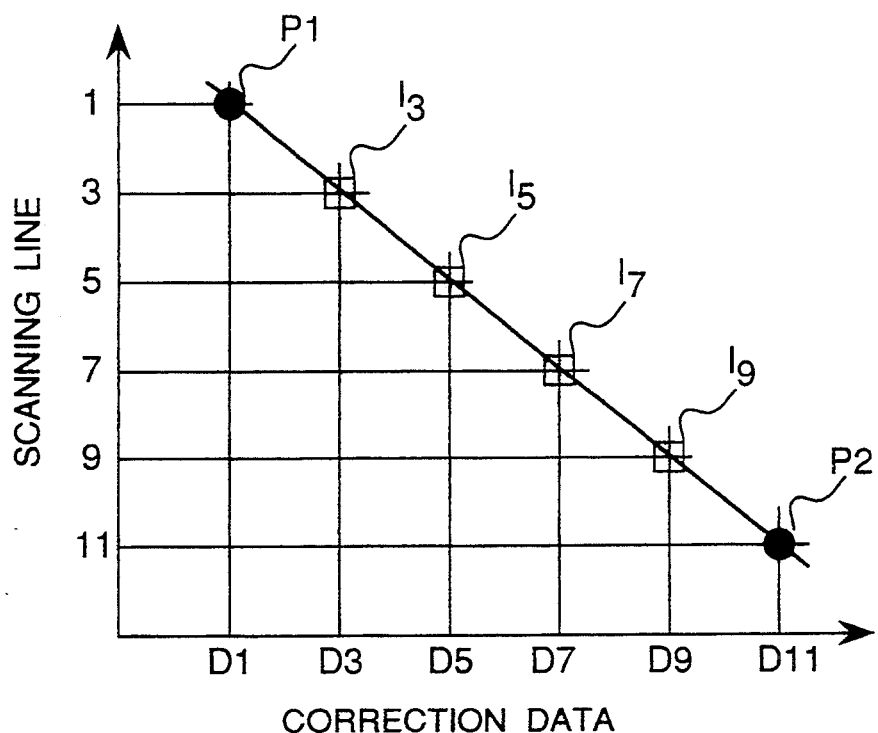
FIGS. 3(a) and 3(b) are characteristic views for explaining the interpolation of correction data in the embodiment.

Referring to FIG. 3(a), adjustment points P1 and P2 are indicated by filled dots in the figure, and correction data for the adjustment points P1 and P2 are stored in the convergence memory 3, which the correction data are read by the interpolator 4 from the convergence memory 3. Based on the correction data read out by the interpolator 4, correction data (D3, D5, D7, D9) corresponding to the scanning lines (3, 5, 7, 9) between the adjustment points P1 and P2 are determined by vertical interpolation according to the scanning-line number detection signal, whereby interpolation data for interpolation between the adjustment points P1 and P2 are prepared as indicated by square marks (I3, I5, I7, I9) as shown in FIG. 3(a).

Figure 3B:
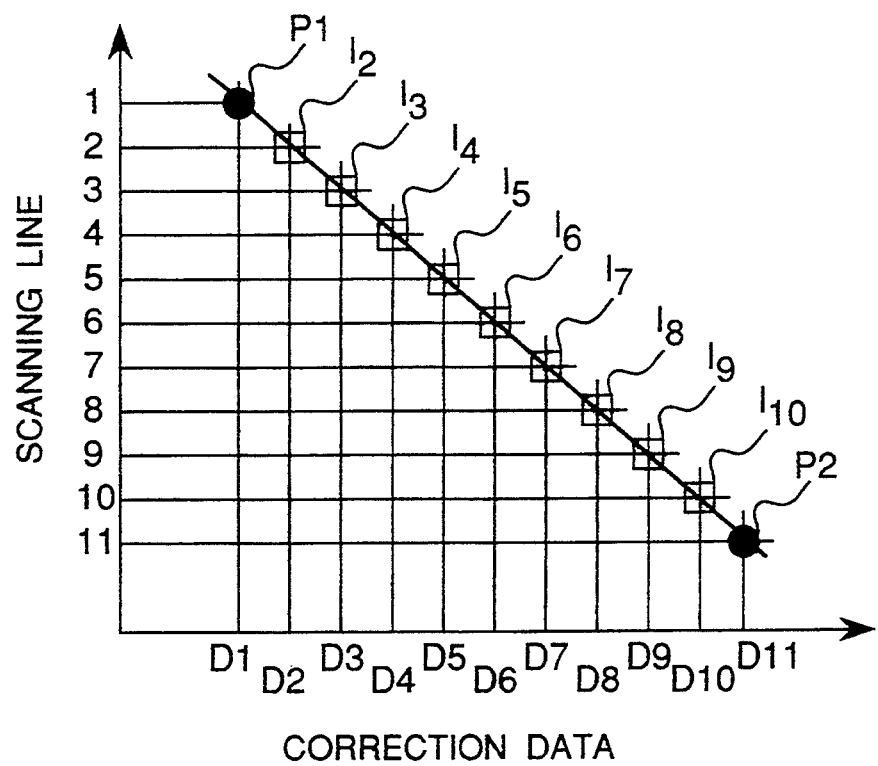

FIG. 3(b) shows an interpolation effected when the scanning lines are doubled in number to that of FIG. 3(a). As shown in FIG. 3(b), correction data (D2 to D10) corresponding to the scanning lines (2 to 10) between the adjustment points P1 and P2 are determined from the correction data (D1, D11) for the adjustment points P1 and P2 by vertical interpolation, whereby interpolation data for interpolation between the adjustment points P1 and P2 are prepared as indicated by square marks (I2 through I10) as shown in FIG. 3(b).

Figure 4A:
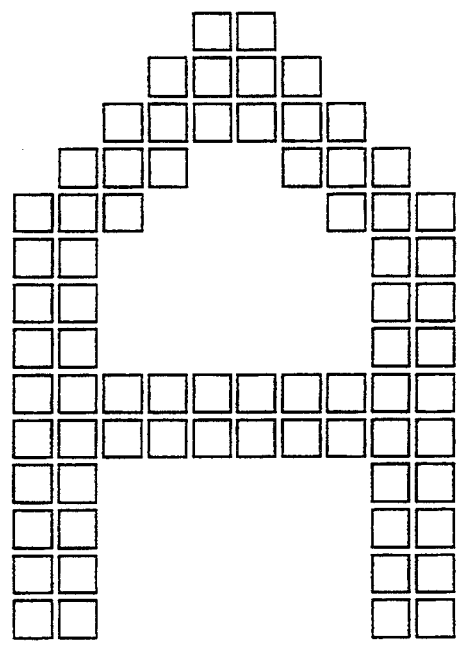
FIGS. 4(a) and 4(b) are characteristic views for explaining the interpolation of character data in the embodiment.
Figure 4B:
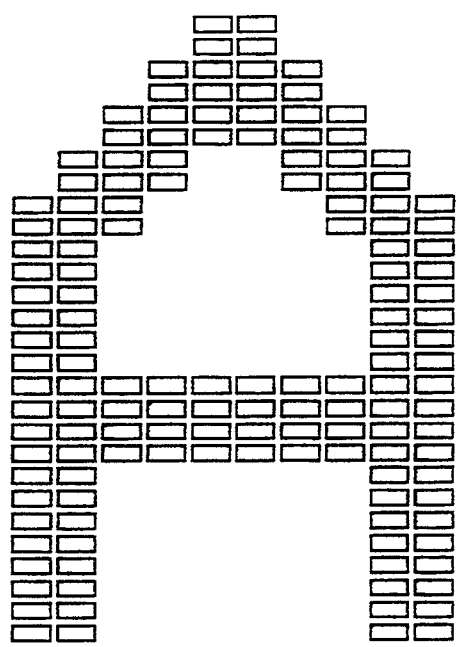

FIG. 4(a) shows interpolated data in the case of the standard number of scanning lines, and FIG. 4(b) shows the interpolation effected when the number of scanning lines doubles. As shown in FIG. 4(a), stored in the OSD memory 5 is font data of alphabetical character A, which the character font data is read out from the OSD memory 5 and fed to the interpolator 4. Based on the read out correction data, the interpolator 4 performs interpolation of the font data according to the scanning-line number detection signal supplied from the scanning-line number detector 2. As shown in FIG. 4(b) showing the case where the scanning-line number is doubled, the interpolation data is determined by effecting vertical interpolation with twice reading out operations of the font data of FIG. 4(a).

The data subjected to interpolation in correspondence to the number of scanning lines is fed from the interpolator 4 to the frame memory 6 to be stored therein. Convergence correction data derived from the frame memory 6 is fed to the D/A converter 7, where the digital convergence correction data is converted into an analog signal. On the other hand, character data derived from the frame memory 6 is fed to the P/S converter 8, where the parallel character data is converted into a serial data form.

As described above, according to the present embodiment, even with different numbers of scanning lines as shown in FIGS. 3(a), 3(b) and FIGS. 4(a), 4(b), vertical interpolation is controlled depending on the scanning-line number detection signal to prepare correction data and character data, thus allowing signal generation to be implemented in accordance with the number of scanning lines.

Figure 5:
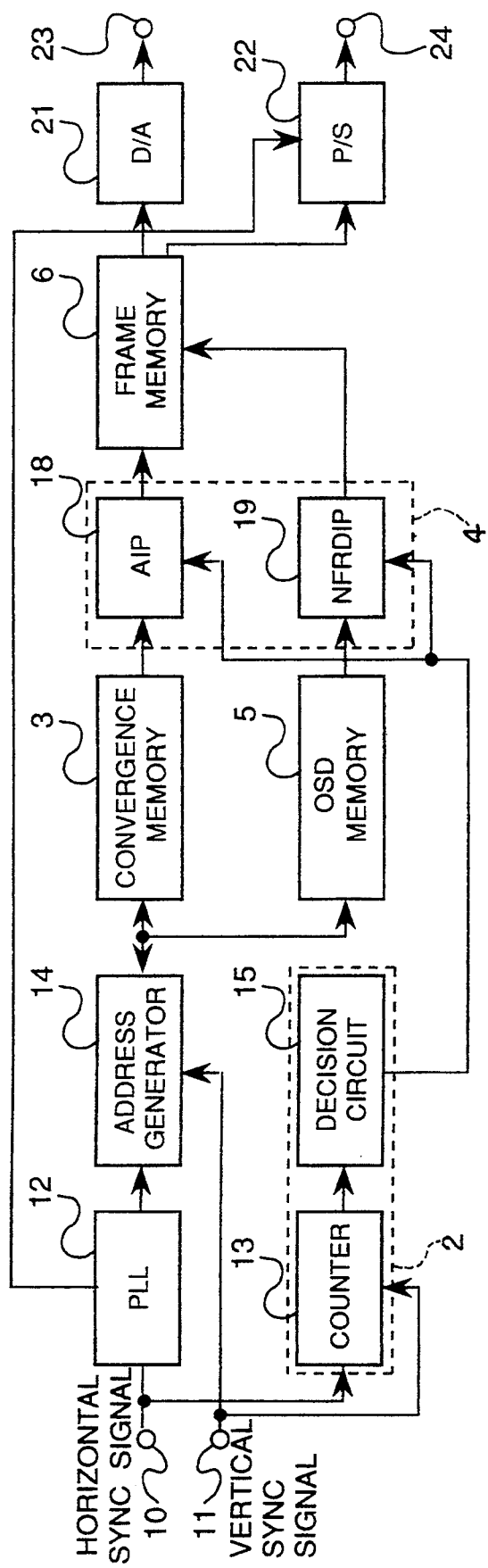
FIG. 5 is a block diagram for explaining the interpolation in the embodiment.

Next, the processing of interpolation is described in detail with reference to the block diagram of FIG. 5 and the operating waveforms of FIGS. 6(a) through 6(h).

Figure 6A:
FIGS. 6(a), 6(b), 6(c), 6(d), 6(e), 6(f), 6(g) and 6(h) are views for explaining the operation of interpolation in the embodiment.
Figure 6B:
Figure 6C:
Figure 6D:
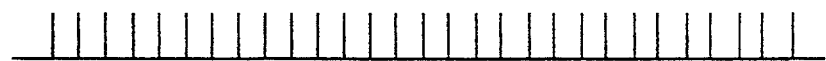
Figure 6E:
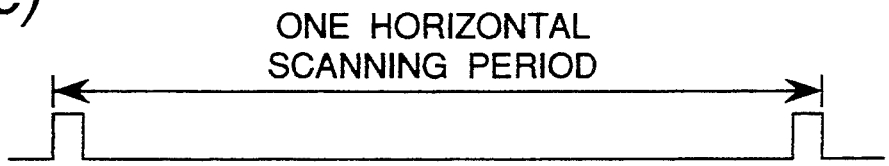
Figure 6F:
Figure 6G:
Figure 6H:
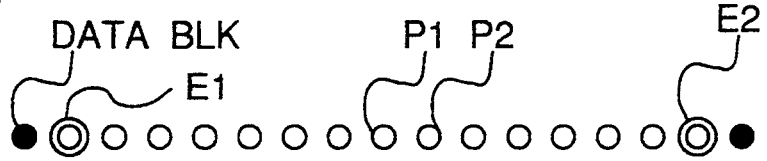

A horizontal sync signal entered through an input terminal 10 is fed to a PLL (Phase Lock Loop) circuit 12, which generates a clock signal for OSD orientation shown in FIG. 6(d). The OSD clock signal is frequency-divided by 2 to obtain a correction clock signal of FIG. 6(c) which is fed to an address generator 14. A test signal and an address signal are shown in FIGS. 6(f) and 6(g), respectively, where one horizontal period of the horizontal sync signal shown in FIG. 6(e) contains 13 adjustment points within the screen, as shown in FIG. 6(h), two extrapolated points E1 and E2 and one data element BLK outside the screen, that is totaling 16 points are included in one horizontal period of the horizontal sync signal.

The test signal between the adjustment points P1 and P2 is shown in FIG. 6(a), where the addresses of the correction data are multiplexed in time division into six types of R-H, R-V, G-H, G-V, B-H and B-V as shown in FIG. 6(b). Accordingly, the clock signal of FIG. 6(c) is generated as a correction clock signal while the clock signal of FIG. 6(d) is generated as an OSD clock signal. For example, a correction clock signal CLKC and an OSD clock signal CLKO at a horizontal scanning frequency of 33.75 kHz are as follows:

<Correction clock signal CLKC>

$$CLKC = 33.75 \text{ kHz} \times 12 \times 16 = 6.48 \text{ MHz}$$

<OSD clock signal CLKO>

$$CKLO = 33.75 \text{ kHz} \times 12 \times 16 \times 2 = 12.96 \text{ MHz}$$

In the address generator 14, address signals from the correction clock signals derived from the PLL circuit 12 and address signals from the vertical sync signals derived from the input terminal 11 are generated, and fed to the convergence memory 3 and OSD memory 5, respectively. Horizontal sync signals and vertical sync signals derived from the input terminals 10 and 11 are fed to a counter circuit 13, where the number of horizontal sync signals are counted within the vertical period. The signals derived from the counter circuit 13 are fed to a decision circuit 15, where the number of scanning lines per one field is determined. The counter circuit 13 and decision circuit 15 are provided in the scanning-line number detector 2. The scanning-line number decision signal derived from the decision circuit 15 is fed to an approximate interpolation processing (AIP) circuit 18 and an n-fold reading and decimation interpolation processing (NFRDIP) circuit 19, where the AIP circuit 18 and NFRDIP circuit 19 are provided in the interpolator 4.

The approximate interpolation processing (AIP) circuit 18 calculates the number of scanning lines between the adjustment points according to the scanning-line number detection signal to generate an approximation factor corresponding to each scanning line, thus performing approximate interpolation between the adjustment points with the approximation factor.

Figure 7A:
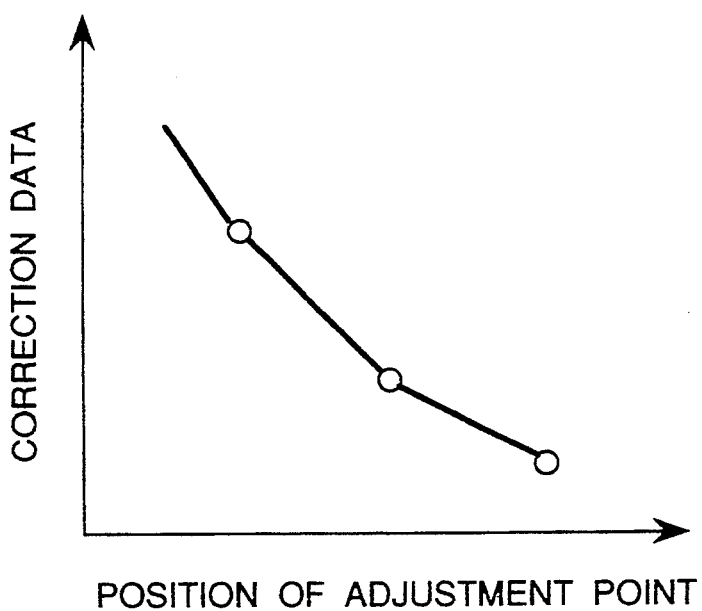
FIGS. 7(a) and 7(b) are graph views for explaining the operation of approximate interpolation in the embodiment.
Figure 7B:
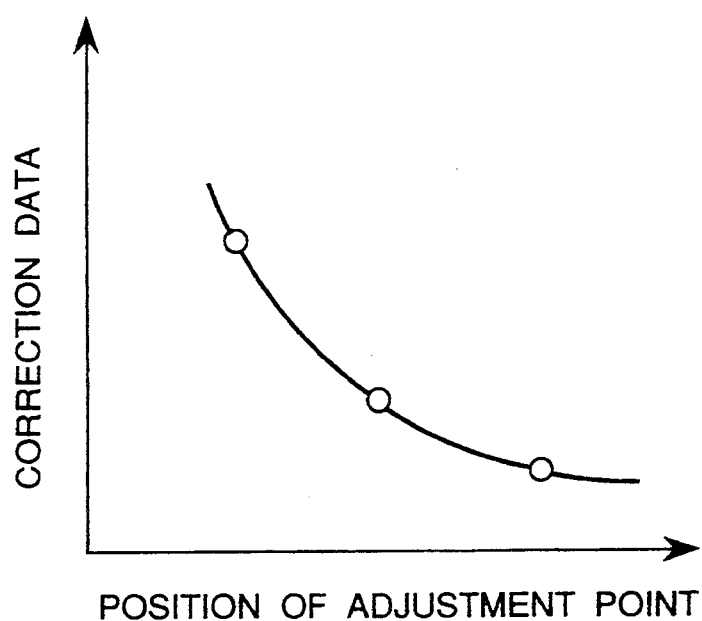
Figure 8A:
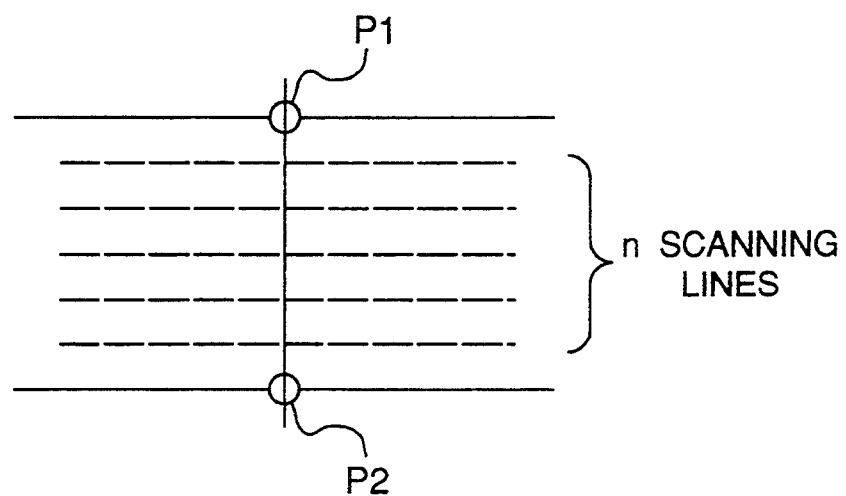
FIGS. 8(a) and 8(b) are charts showing the relation of adjustment positions and correction data on the screen in the approximate interpolation in the embodiment.
Figure 8B:
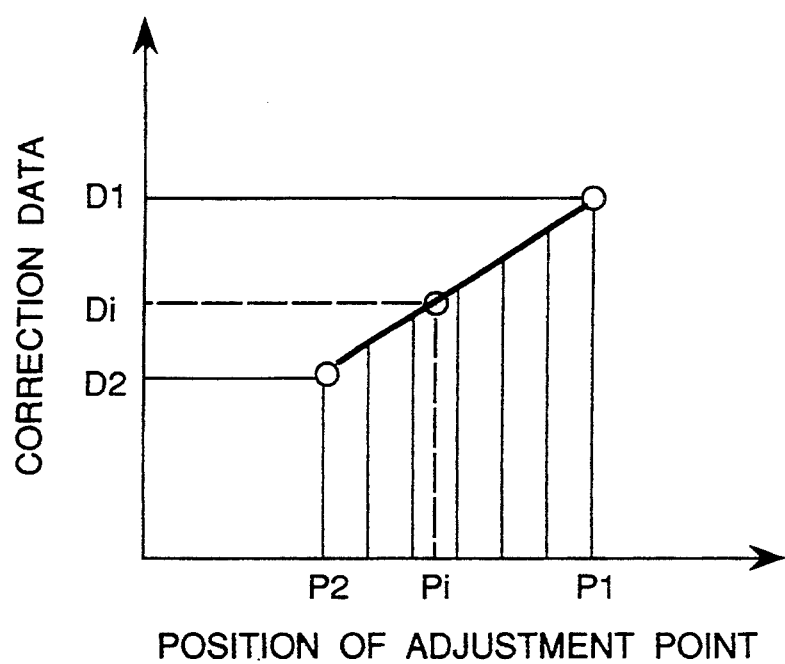

Approximate interpolation can be implemented either in linear approximation between two points as shown in FIG. 7(a), or in curve approximation among three points as in FIG. 7(b). The operation in the case of linear approximate interpolation is outlined in FIGS. 8(a) and 8(b). In FIG. 8(a), assuming that the number of scanning lines between adjustment points (P1, P2) is n and that correction data elements for adjustment points P1 and P2 are D1 and D2, respectively, the resulting correction data Di for the ith scanning line from the adjustment point P2 in FIG. 8(b) can be represented by the following expression:

$$Di = (D1 - D2) \times i/n + D2$$

where D1 is correction data for adjustment point P1; D2 is correction data for adjustment point P2; Di is correction data for the ith scanning line from D2; n is the number of scanning lines between adjustment points; and i/n is the interpolation factor.

Referring back to FIG. 5, the correction data D1 and D2 are stored in the convergence memory 3, and fed to the approximate interpolation processing (AIP) circuit 18 to be used for generation of the number of scanning lines between adjustment points and the interpolation factor with use of a CPU and the like in the approximate interpolation processing (AIP) circuit 18, the resulting signals being used to perform approximate interpolation in the vertical direction.

In the n-fold reading and decimation interpolation processing (NFRDIP) circuit 19, a signal of the number of times of reading character data and a signal of the decimation interpolation processing are generated according to the scanning-line detection signal, the resulting signals being used to perform the n-fold reading and decimation interpolation processing (NFRDIP). When the number of scanning lines varies in steps of n-fold integers, only controlling the number of times of reading operation is required; otherwise, when the number of scanning lines varies arbitrarily, decimation processing is necessary.

FIGS. 9(a) to 9(c) illustrate a performance of the n-fold reading and decimation interpolation processing (NFRDIP), where FIG. 9(a) shows character font data stored in the OSD memory 5. When the number of scanning lines S1 to S11 as shown in FIG. 9(a) are converted into the number of scanning lines S1 to S15 as shown in FIG. 9(b), only two-fold reading would result in a larger character size in the vertical direction as shown in FIG. 9(c). Therefore, by performing both two-fold reading processing and decimation processing, a character signal having an equal character size is generated as shown in FIG. 9(b). Character data at each scanning line is shown in Table 1.

TABLE 1

| | Operation for interpolation | |
|---|---|---|
| Scanning line | Character data | Interpolation |
| S1 | F1 | Decimation |
| S2 | F2 | Two-time reading |
| S3 | F2 | — |
| S4 | F3 | Decimation |
| S5 | F4 | Two-time reading |
| S6 | F4 | — |
| S7 | F5 | Decimation |
| S8 | F6 | Decimation |
| S9 | F7 | Two-time reading |
| S10 | F7 | — |
| S11 | F8 | Decimation |
| S12 | F9 | Two-time reading |
| S13 | F9 | — |
| S14 | F10 | Decimation |
| S15 | F11 | Decimation |

As shown in Table 1, in the eleven scanning lines S1 through S11 corresponding to the character font data F1 through F11 in FIG. 9(a), four points are subjected to two-time reading and seven points are subjected to decimation processing, whereby such an interpolation as in FIG. 9(b) can be accomplished. The decimation processing can be optimized, for example, by selecting font data elements of the reference character font data in FIG. 9(a), whichever closer to the vector on the scanning lines, as to be described later with reference to FIGS. 10(a) and 10(b). Also, it is possible to previously set the priority order of effecting the decimation processing for each character font data element, thereby effecting the decimation processing in the order of priority.

The interpolated correction data corresponding to the individual scanning lines, are derived from the approximate interpolation processing (AIP) circuit 18 and the interpolated character data corresponding to the individual scanning lines, are derived from the n-fold reading and decimation interpolation processing (NFRDIP) circuit 19, both being stored in the frame memory 6. A signal generated by serial-to-parallel converting the data resulting from time-division-multiplexing the six types of correction data derived from the frame memory 6 is fed to a D/A converter 21, where convergence correction data in the form of analog signal appears at an output terminal 23. Also, the character data derived from the frame memory 6 is fed to a P/S converter 22, where it is converted into a serial signal with the OSD clock signal derived from the PLL circuit 12, thus a character signal appearing at an output terminal 24.

The reading of data in the horizontal direction is carried out, as described before, in such a manner that a clock signal corresponding to the horizontal scanning frequency is automatically generated by the PLL circuit 12 which receives horizontal sync signals as input signals, thus eliminating the need for interpolation processing in the horizontal direction.

Next, the decimating interpolation processing (DIP) will be described below with reference to FIGS. 10(a) and 10(b).

Figure 10A:
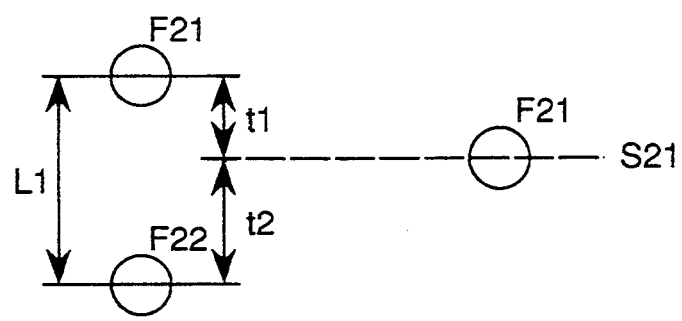
FIGS. 10(a) and 10(b) are schematic views for explaining the operation of the decimating interpolation.
Figure 10B:
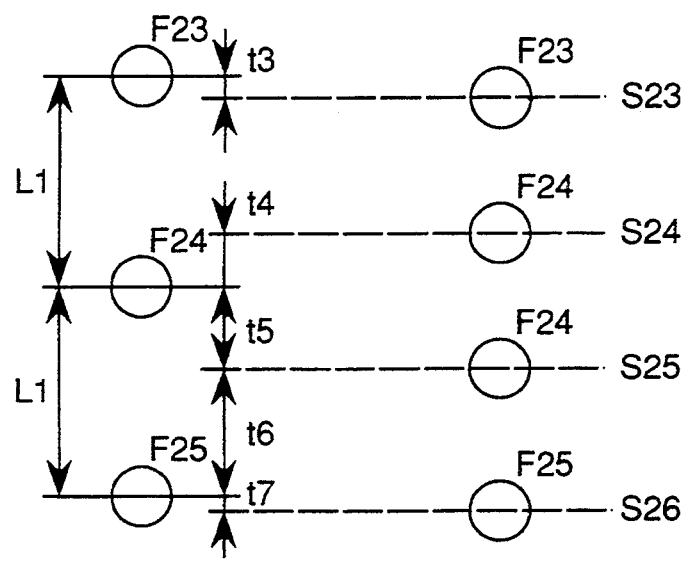

Referring to FIGS. 10(a) and 10(b), in the left portion of the figures, the character font data stored in the OSD memory 5 are illustrated on real lines of scanning lines, and the decimation-interpolated data are illustrated on broken lines of scanning lines in the right portion of the figures. Since the number of display characters for OSD is predetermined, the pitch L1 of the scanning lines in the vertical direction is predetermined. Therefore, the decimating interpolation is carried out by selecting font data elements closer to the vector on the scanning lines. Accordingly, in FIG. 10(a), the distances between the broken line and the character font data F21 and F22 on the real lines are respectively $t_1$ and $t_2$ ($t_1 < t_2$). Due to the relationship of $t_1 < t_2$, the data F21 is selected as an interpolation data for the scanning line S21. Also in FIG. 10(b), the distances between the data F23 and the broken line S23, between the data F24 and the broken lines S24 and S25, between the data F25 and the broken lines S25 and S26 are respectively $t_3$, $t_4$, $t_5$, $t_6$ and $t_7$ ($t_4 < t_5$, $t_5 < t_6$). Therefore, the data F23 is selected for the line S23, F24 is selected for S24 and S25, and F25 is selected for S26. Thus, the decimating interpolation is performed by selecting the font data closer to the vector on the scanning lines thereby to form a character signal.

Next, the following describes the constructions and reading operations of the convergence memory 3 and OSD memory 5 with reference to FIGS. 11(a) to 11(d) and 12(a) to 12(f).

Figure 11A:
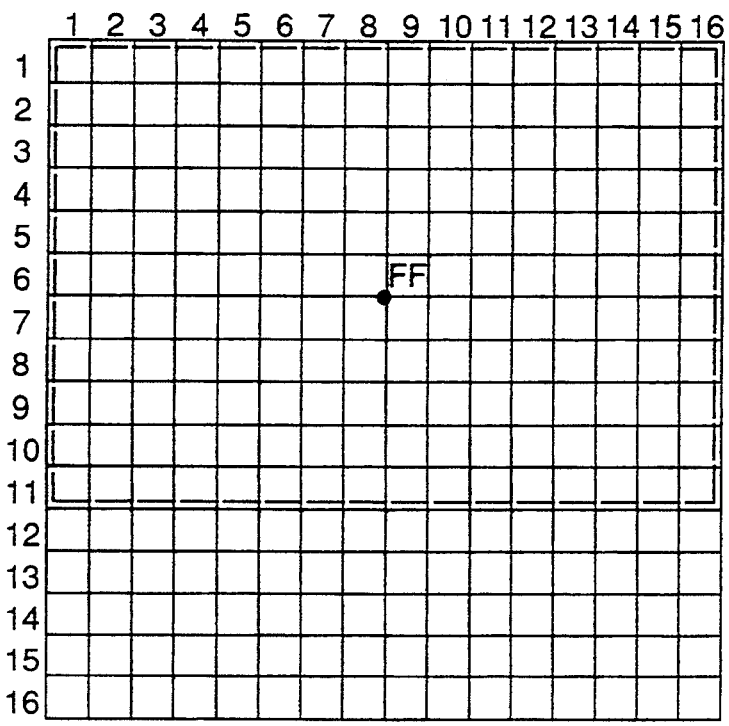
FIGS. 11(a) and 11(b) are diagrams of memory maps of a convergence memory in the present embodiment.
Figure 11B:
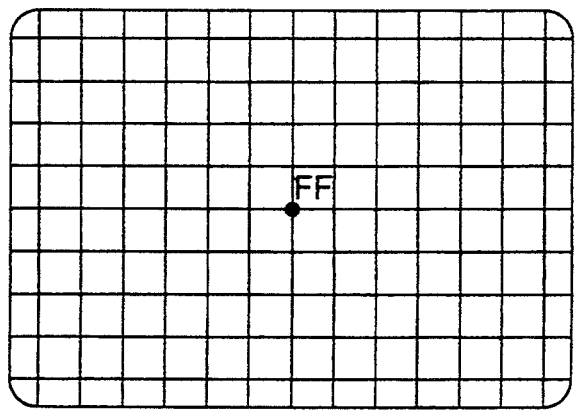
Figure 11C:
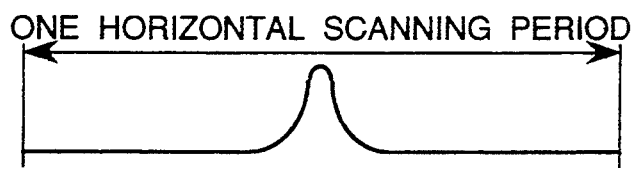
FIGS. 11(c) and 11(d) are charts of correction waveforms for explaining the operation of the convergence memory in the present embodiment.
Figure 11D:
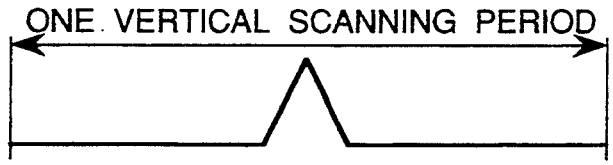

Referring to FIGS. 11(a) to 11(d) for explaining the convergence memory 3, FIG. 11(a) shows a memory map, FIG. 11(b) shows an interpolated memory map in the final display screen, and FIGS. 11(c) and 11(d) show convergence correction waveforms in the horizontal and vertical interpolations respectively. The interpolated data is D/A converted by means of the D/A converter and the D/A converted data is passed through a low-pass-filter for smoothing the data in the horizontal direction thereby to obtain an analog correction waveforms as shown in FIGS. 11(c) and 11(d).

It is assumed that the convergence adjustment points are comprised of totaling 16 points in one horizontal scanning period consisting of 13 adjustment points within the screen in the horizontal direction, and two extrapolated points and one data element BLK outside the screen as shown in FIG. 6(h), while the convergence adjustment points are comprised of totaling 11 points in one vertical scanning period consisting of 9 adjustment points within the screen in the vertical direction and two extrapolated points outside the screen.

In the memory map shown in FIG. 11(a), the area of 16×11 addresses surrounded by a broken line in the 16×16 addresses is used as a convergence correction data area, and when data FFH of 16 scale system of notation is written only in the center portion of the screen, the correction point on the final display screen is located as indicated by a black dot shown in FIG. 11(b). In the case where the FFH data is written only at the center portion of the screen shown in FIG. 11(a) and the other parts of the screen have OOH data written, the convergence correction waveforms in the horizontal and vertical interpolations are as shown in FIGS. 11(c) and 11(d) respectively, where the correction data is written at the middle portion of each scanning period. In this convergence case, the interpolation between the adjustment points is carried out only in the vertical direction by the AIP circuit 18 shown in FIG. 5, and the interpolation in the horizontal direction is carried out by the low-pass filter (LPF) provided in the stair following to the D/A converter 21, resulting in obtaining the correction waveforms as shown in FIGS. 11(c) and 11(d).

Figure 12A:
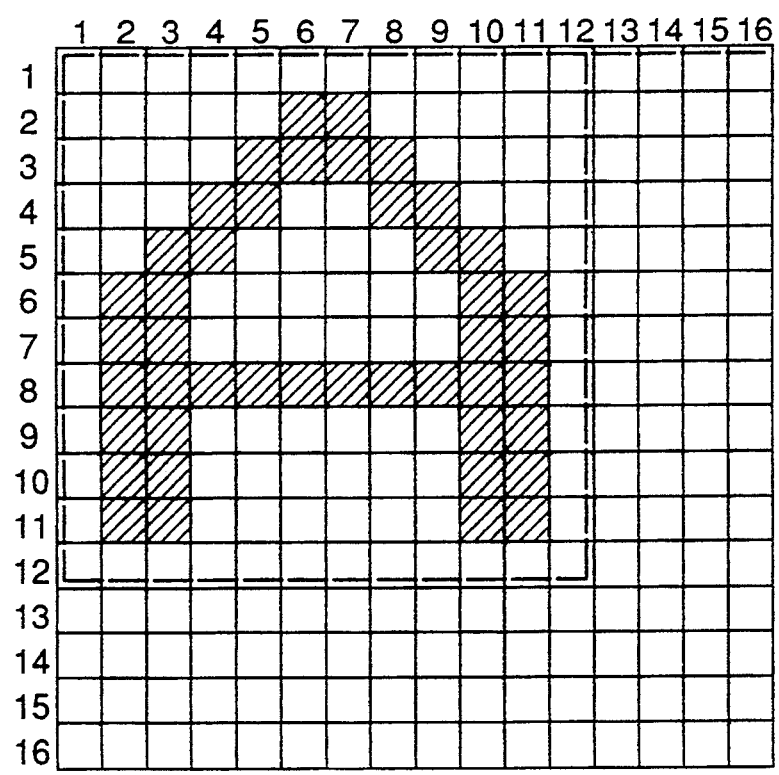
FIG. 12(i a) is a diagram of a memory map of an OSD memory in the present embodiment.
FIGS. 12(b), 12(c), 12(d) and 12(e) are timing charts for explaining the operation of the OSD memory in the present embodiment.
FIG. 12(f) is a diagram of a character display on the screen in the present embodiment.

Referring to FIGS. 12(a) to 12(f) for explaining the OSD memory 5, FIG. 12(a) shows a memory map, FIGS. 12(b) to 12(e) show timing charts, and FIG. 12(f) shows an OSD signal displayed on the screen.

It is assumed that the convergence adjustment points are comprised of totaling 16 points in one horizontal scanning period consisting of 13 adjustment points within the screen in the horizontal direction, and two extrapolated points and one data element BLK outside the screen, and comprised of totaling 11 points in one vertical scanning period consisting of 9 adjustment points within the screen in the vertical direction and two extrapolated points outside the screen.

In the memory map shown in FIG. 12(a), the area of 12×12 addresses surrounded by a broken line in the 16×16 addresses is used as an OSD data area, and when character data of alphabet A is written, the picture of the character A is displayed on the final display screen as shown in FIG. 12(f). FIG. 12(b) shows a timing pulse between the adjustment points when the convergence correction is performed. In this period, the character font data and sampling (Ys) data shown in FIG. 12(d) are read depending on the address signals shown in FIG. 12(c) as described before. As shown in FIG. 12(d), the portion between the adjustment points is composed of two-character data. The font data and the Ys data are separated to each other, and thereafter the separated data is serial-to-parallel (S/P) converted by means of a S/P converter in synchronization with the OSD clock signal shown in FIG. 12(e) to generate a character signal of binary data, thereby displaying the character superposed with a video signal on the screen. Thus, the convergence adjustment can be effected with 13×9=117 adjustment points while displaying 432 characters in total number, i.e., 24 (horizontal)×18 (vertical)=432 in the screen.

Next, the entire system of the signal generating apparatus is described below with reference to FIG. 13. The processing of the interpolator 4 and the scanning-line number detector 2 is performed by processing a software by means of a microprocessor (CPU) 26.

Figure 13:
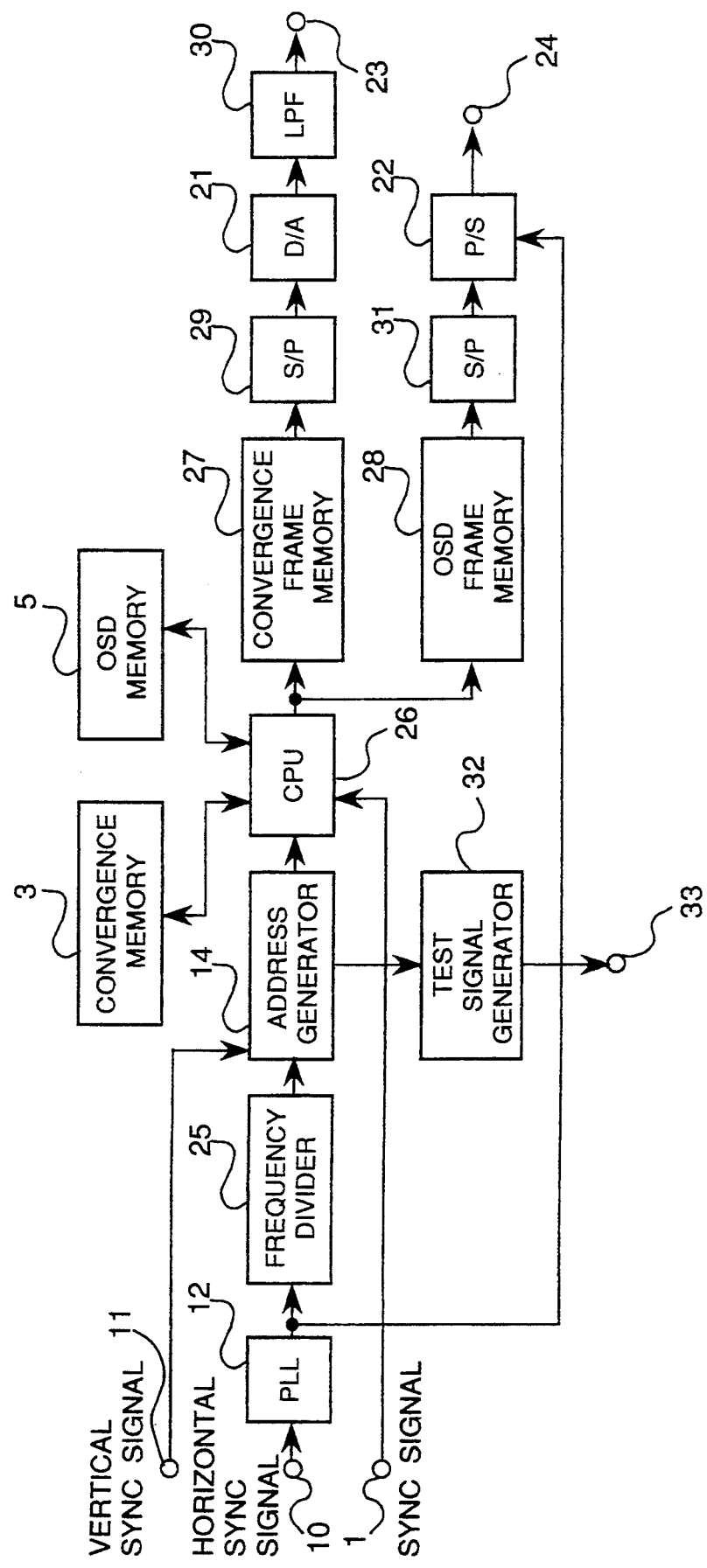
FIG. 13 is a block diagram of an entire part of the system in the present embodiment.
Figure 14:
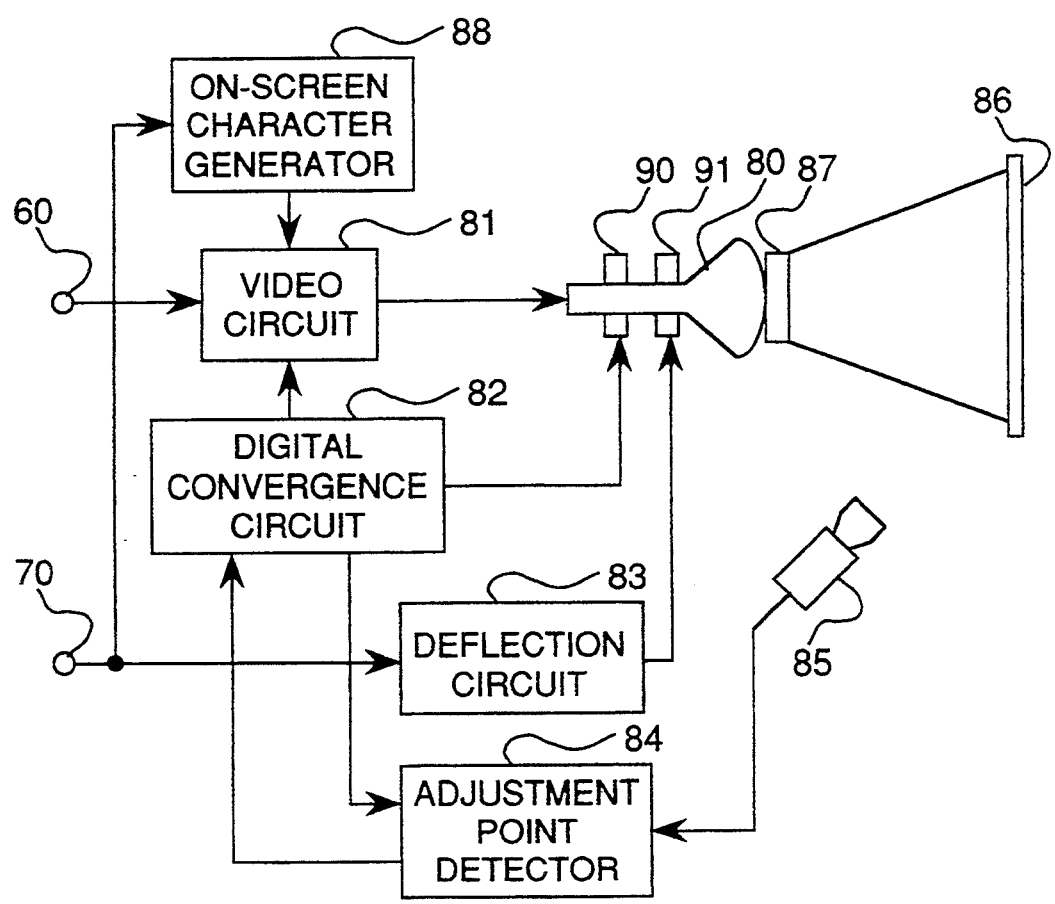
FIG. 14 is a block diagram of a conventional signal generating apparatus.
Figure 15:
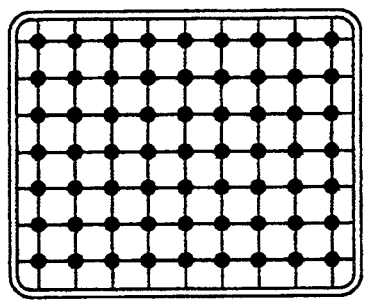
FIG. 15 is a view showing a display screen of the conventional signal generating apparatus.

Referring to FIG. 13, the input horizontal sync signal is applied to the PLL circuit 12 through the input terminal 10, where the OSD clock signal is generated and fed to the P/S converter 22. The OSD clock signal derived from the PLL circuit 12 is also fed to the frequency-½-divider 25 where a correction clock signal with its frequency divided by two is fed to the address generator 14. The address generator 14 generates each address with receipt of the correction clock signal derived from the PLL circuit 12 and the vertical sync signal fed through the input terminal 11, which the resultant address signals are fed to the convergence memory 3 and the OSD memory 5 by way of the microprocessor (CPU) 26.

In the convergence memory 3 and the OSD memory 5 are supplied with the correction data between the respective adjustment points, character font data, Ys data and the like stored therein. The microprocessor (CPU) 26 detects the scanning-line number with the sync signal applied through the input terminal 1 to effect the interpolation of the data of the convergence memory 3 and the OSD memory 5 thereby to form data for each scanning line so that the data of the entire screen are stored in the convergence frame memory 27 and the OSD frame memory 28 respectively. The correction data shown in FIG. 12(c) derived from the convergence frame memory 27 resulting from time-division-multiplexing the six types of correction data is serial-to-parallel converted by means of the S/P converter 29 to generate six types of correction data. The correction data derived from the S/P 29 is fed to the D/A converter 21, where the convergence correction data in the form of analog signal appears at the output terminal 23 by way of the low-pass filter 30, which the correction data is amplified and fed to the convergence york to perform the convergence correction.

Also, the character data shown in FIG. 12(d) derived from the OSD frame memory 28 resulting from time-division-multiplexing the data corresponding to two characters between the adjustment points is fed to the S/P converter 31 where the data is serial-to-parallel converted to generate two types of character data. Each character data derived from the S/P converter 31 is fed to the P/S converter 22 for converting a parallel signal into a serial signal with the OSD clock signal shown in FIG. 12(e) derived from the PLL circuit 12, thus the character signal of two types of font data and Ys data are generated through the output terminal 24.

As described hereinabove, according to the present embodiment, since a convergence correction signal and a character signal are generated according to the number of scanning lines, it is possible to effect signal generation even with signal sources differing in scanning frequency and also to generate high-accuracy convergence correction signals and character signals, by sharing the vertical interpolation in common both the convergence correction data and the character OSD data.

It is to be noted that although the present embodiment has been described on a projection type video projector to facilitate the understanding, the description is of course applicable also to direct-vision type color CRTs.

Further, although the present embodiment has been described on a case where a convergence correction signal and a character signal are generated, the present embodiment is applicable to the case where other signals are generated.

Although the present embodiment has been described on a case where a frame memory is used as a means for successively reading the data elements derived from interpolation processing means in the present embodiment, other reading means may also be used instead of the frame memory. Furthermore, needless to say, the frame memory may be omitted when an output means for successively reading are used in addition to an interpolation means incorporated with the interpolator.

Although the present embodiment has been described on a case where signals of numerals and alphabetical characters are generated, other test signals may also be generated instead.

Although the present embodiment has been described on a case where convergence correction data and character data are stored in separate memories for facilitating the understanding, the both data may also be stored in the same memory.

Although the present embodiment has been described on a case where data interpolation is performed in linear approximation between two points or curve approximation among three points, other interpolation processing may be performed instead.

Although the present embodiment has been described on a case where the interpolation is implemented with one type of character font data, a plurality of character font data elements for the individual scanning lines may be prepared to perform the interpolation.

As described above, a correction signal and a character signal are generated through vertical interpolation of correction data and character data effected with a detection signal resulting from detecting the number of scanning lines, whereby it becomes possible to reduce the circuit scale by automatically following signal sources different in scanning frequency for signal generation while high-accuracy correction can be implemented.

Further, according to the present invention, correction data is subjected to approximate interpolation between adjustment points while character data is subjected to interpolation of n-fold reading and decimation processing of character font, whereby a high-accuracy correction signal and a character signal stable and constant in display size can be generated.

Furthermore, the conversion rate of character data is n times faster than that at which correction data is converted, thus allowing high-grade character display. Accordingly, the present invention is particularly effective for video projectors which can treat signal sources differing in scanning frequency or aspect ratio, to a great advantage in practical use.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A signal generating apparatus, comprising:
   first storage means for storing convergence correction data corresponding to a plurality of adjustment points provided on a screen;
   second storage means for storing on-screen character data;
   detection means for detecting number of scanning lines based upon an input sync signal;
   interpolation means for subjecting correction data derived from said first storage means to approximate interpolation between the adjustment points and also subjecting character data derived from said second storage means to interpolation in n-folding and decimation processing of character font, based on the number of scanning lines detected by said detection means; and
   reading means for reading the convergence correction data and character data interpolated by said interpolation means in synchronization with a scanning frequency.

2. The signal generating apparatus as claimed in claim 1, wherein said interpolation means performs the decimating interpolation by selecting font data elements closer to the vector on the scanning lines.

3. The signal generating apparatus as claimed in claim 1, wherein the reading conversion rate of character data is n times faster than that of correction data.

* * * * *

UNITED STATES PATENT AND TRADEMARK OFFICE
CERTIFICATE OF CORRECTION

PATENT NO.    : 5,398,083
DATED         : March 14, 1995
INVENTOR(S)   : Tsujihara et al.

It is certified that error appears in the above-identified patent and that said Letters Patent is hereby corrected as shown below:

Column 12, line 25, after "detecting" insert --a--.

Signed and Sealed this

Fourth Day of July, 1995

Attest:

BRUCE LEHMAN

*Attesting Officer*     *Commissioner of Patents and Trademarks*